(12) United States Patent
Boye et al.

(10) Patent No.: US 12,320,474 B2
(45) Date of Patent: Jun. 3, 2025

(54) CRYOGENIC TANK

(71) Applicant: L'Air Liquide, Société Anonyme pour l'Etude et l'Exploitation des Procédés Georges Claude, Paris (FR)

(72) Inventors: Guillaume Boye, Voiron (FR); Loic Jeunesse, Grenoble (FR); Florent Cordeau, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 32 days.

(21) Appl. No.: 18/210,201

(22) Filed: Jun. 15, 2023

(65) Prior Publication Data

US 2023/0408031 A1    Dec. 21, 2023

(30) Foreign Application Priority Data

Jun. 17, 2022  (FR) ...................................... 2205958

(51) Int. Cl.
*F17C 1/08*    (2006.01)
*F17C 3/08*    (2006.01)

(52) U.S. Cl.
CPC ........ *F17C 3/08* (2013.01); *F17C 2201/0109* (2013.01); *F17C 2203/012* (2013.01);
(Continued)

(58) Field of Classification Search
CPC .......... F17C 2203/012; F17C 2203/013; F17C 2203/011; F17C 1/08; F17C 1/02; F17C 3/08; F17C 2203/0391; F17C 2223/0161
See application file for complete search history.

(56) References Cited

U.S. PATENT DOCUMENTS 3,713,560 A * 1/1973 Slysh .................... F17C 13/086
                                                 220/901
3,969,563 A * 7/1976 Hollis, Sr. ................. E04C 2/34
                                                 428/920
(Continued)

FOREIGN PATENT DOCUMENTS

EP    0 487 374    5/1992
EP    3 875 832    9/2021
FR      861 544    2/1941

OTHER PUBLICATIONS

French Search Report for corresponding FR 2205958, Jan. 19, 2023.

*Primary Examiner* — Stephen J Castellano
(74) *Attorney, Agent, or Firm* — Elwood L. Haynes

(57) ABSTRACT

The invention relates to a cryogenic tank comprising an inner shell intended to contain the cryogenic fluid, an outer shell arranged around the inner shell and delimiting a space between the two shells under vacuum, the outer shell extending in a longitudinal direction and having a plurality of reinforcing ribs distributed in planes that are perpendicular to the longitudinal direction, the ribs being formed by deformations, for example by knurling, on one and the same wall of the outer shell, wherein the tank also includes at least one reinforcing element for reinforcing at least part of at least one of the ribs, the reinforcing element comprising a strip rigidly connected to the two portions of the wall situated at the base and on either side of the rib.

5 Claims, 2 Drawing Sheets

(52) U.S. Cl.
CPC ............ *F17C 2203/0391* (2013.01); *F17C 2203/0629* (2013.01); *F17C 2203/0636* (2013.01); *F17C 2221/012* (2013.01); *F17C 2221/017* (2013.01); *F17C 2223/0161* (2013.01)

(56) References Cited

U.S. PATENT DOCUMENTS

| | | |
|---|---|---|
| 5,375,735 A | 12/1994 | Huvey et al. |
| 5,533,340 A * | 7/1996 | Shama .................. F17C 3/08 220/901 |
| 2018/0224064 A1 | 8/2018 | Aceves et al. |

* cited by examiner

CRYOGENIC TANK

CROSS REFERENCE TO RELATED APPLICATIONS

This application claims the benefit of priority under 35 U.S.C. § 119 (a) and (b) to French Patent Application No. 2205958, filed Jun. 17, 2023, the entire contents of which are incorporated herein by reference.

BACKGROUND

The invention relates to a cryogenic tank.

The invention relates more particularly to a cryogenic tank, in particular for transporting cryogenic fluid, for example liquefied helium or hydrogen, comprising an inner shell made of a metal material or alloy and intended to contain the cryogenic fluid, an outer shell made of a metal material or alloy, arranged around the inner shell and delimiting a space between the two shells, said space being under vacuum, the outer shell extending in a longitudinal direction and comprising a plurality of reinforcing ribs distributed in planes that are perpendicular to the longitudinal direction, the ribs being formed by deformations, for example by knurling, on one and the same wall of the outer shell.

Cryogenic tanks conventionally use an insulated double-shell structure under vacuum in order to ensure storage autonomy when transporting cryogenic liquid.

These shells, which are made of metal or an alloy, are produced by boilermaking and are therefore subject to boilermaking construction codes (e.g. ASME VIII). These shells must withstand an external pressure since they contain a vacuum and must not have an impact on the mass of the tank (or the container housing it).

Tanks under vacuum are primarily dimensioned for resistance to external pressure. This mechanical resistance is ensured by a suitable thickness of the shell ring (welded metal sheet forming the cylindrical shell) and/or by stiffening elements.

In the case of transportable tanks made of metal material, optimizing the mass is a significant challenge, the solution of thickening the shell wall not allowing a suitable tank mass to be obtained. One solution would be to use metal materials of aluminium alloy type, but the low Young's modulus of this material requires the thickness to be increased.

One known solution therefore consists of adding stiffeners (ribs) on the wall, namely by adding hoops that are either welded or formed by deforming the shell ring in order to stiffen the latter (knurling, for example).

Reinforcing using welded hoops may pose problems in terms of bulk and these hoops must go all the way around the shell ring in order to guarantee their effectiveness. These hoops are generally thicker than the shell ring and add mass to the equipment.

Reinforcing using ribs formed by deforming the metal sheet (knurling process) does not add any mass to the tank but does result in problems in terms of low axial stiffness of the shell ("accordion" effect). This effect is all the more pronounced on aluminium shells.

SUMMARY

One aim of the present invention is to overcome all or some of the disadvantages of the prior art outlined above.

To this end, the tank according to the invention, which is otherwise in accordance with the generic definition thereof given in the preamble above, is essentially characterized in that the tank also comprises at least one reinforcing element for reinforcing at least part of at least one of the ribs, the reinforcing element comprising a strip rigidly connected to the two portions of the wall situated at the base and on either side of the rib.

Furthermore, embodiments of the invention may comprise one or more of the following features:
- the strip is made of a metal material or alloy and is welded to the outer shell,
- the ribs extend over all or part of the circumference of the outer shell, at least part of the ribs being provided with at least one strip,
- at least part of the ribs is provided with a plurality of discrete strips distributed over part of the circumference of the shell, for example three strips,
- the strips extend in a plane that is perpendicular to the longitudinal direction over 40 to 80%, and preferably 50 to 70%, of the circumference of the outer shell,
- the one or more strips have a width, measured in a direction that is parallel to the longitudinal direction, of between one and three times the width of the rib,
- the first shell and the second shell have a cylindrical general shape with a circular cross section and extending in the longitudinal direction and a circular cross section, the longitudinal axis being oriented horizontally when the tank is in the transport or use configuration,
- the ribs protrude from the exterior surface of the outer shell.

The invention may also relate to any alternative device or method comprising any combination of the features above or below within the scope of the claims.

BRIEF DESCRIPTION OF THE FIGURES

Other distinctive features and advantages will become apparent on reading the description below, provided with reference to the figures in which the invention will be more clearly understood on reading the description which now follows, which is given solely by way of example and with reference to the appended drawings, in which.

DETAILED DESCRIPTION OF THE PREFERRED EMBODIMENTS

Figure 1:
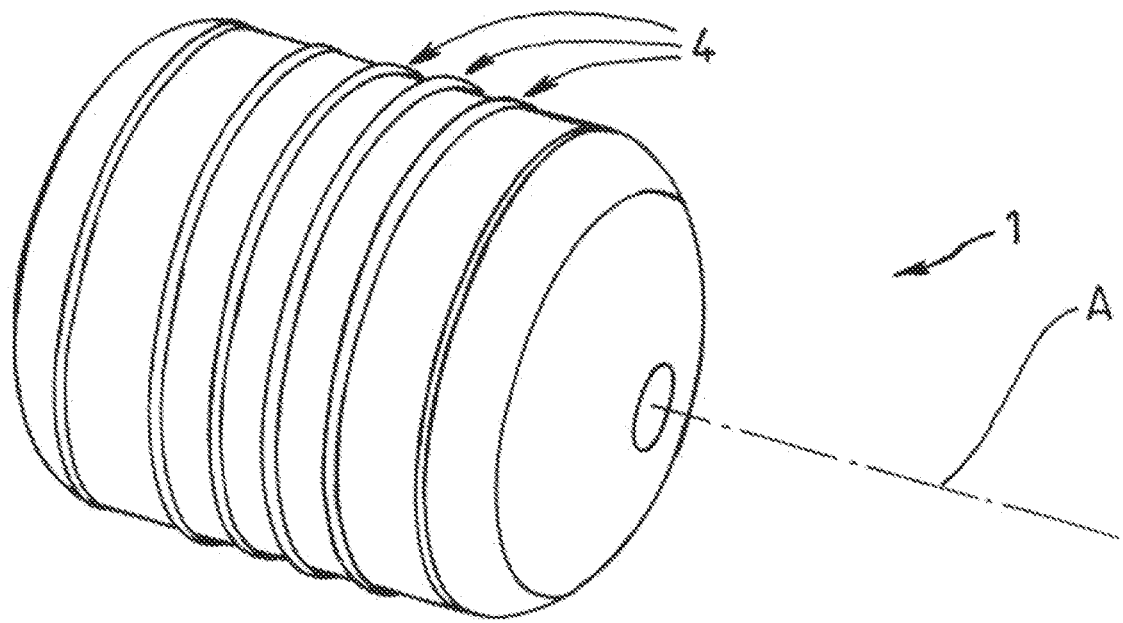
FIG. 1 is a schematic and partial perspective view of an example of a tank according to the invention.
Figure 2:
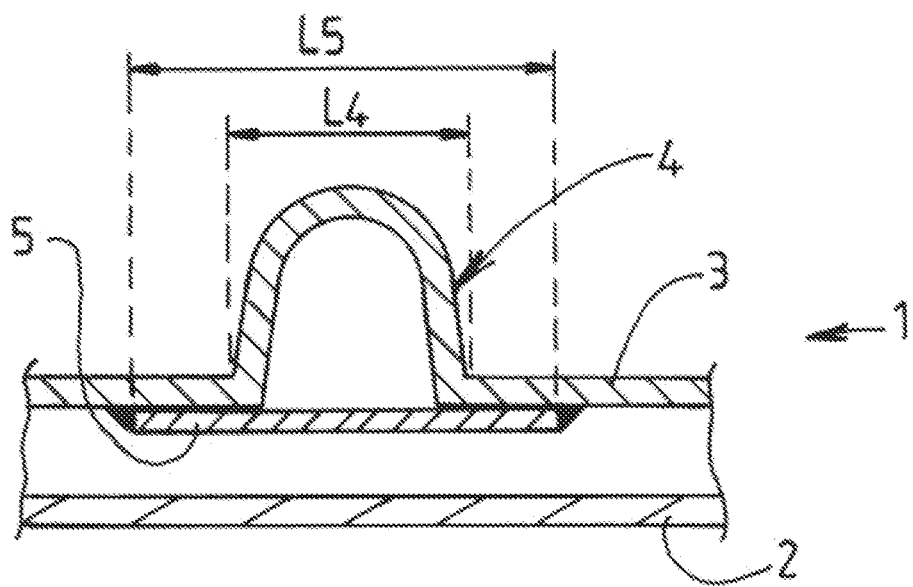
FIG. 2 is a schematic and partial view in longitudinal section of a detail of the tank.
Figure 3:
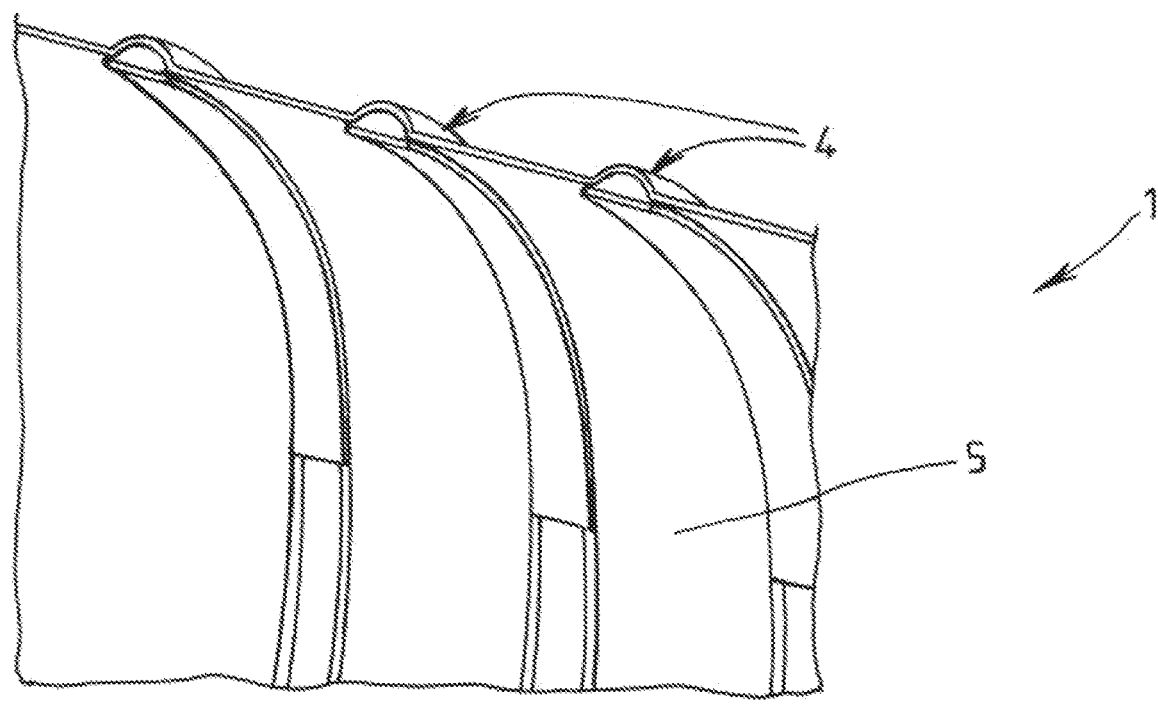
FIG. 3 is a schematic and partial perspective view in cross section of a detail of the tank.

Throughout the figures, the same references relate to the same elements.

In this detailed description, the following embodiments are examples. Although the description refers to one or more embodiments, this does not mean that the features apply only to a single embodiment. Individual features of different embodiments can also be combined and/or interchanged in order to provide other embodiments.

The tank 1 illustrated is a cryogenic tank, for example for storing and transporting cryogenic fluid, for example liquefied helium or hydrogen.

This tank 1 comprises an inner shell 2 made of a metal material or alloy and intended to contain the cryogenic fluid. The tank 1 also comprises an outer shell 3 made of a metal material or alloy, arranged around the inner shell 2 and delimiting a space between the two shells 2, 3. This space is under vacuum and preferably contains thermal insulation, for example multi-layer insulation (MLI).

The tank 1 and, in particular, the outer shell 3 extend in a longitudinal direction A.

As illustrated, the first shell 2 and the second shell 3 preferably have a cylindrical general shape with a circular cross section that extends in the longitudinal direction A.

That is to say that each shell has a central cylindrical portion formed by a metal sheet or shell ring, the ends of which are closed by respective domes.

Preferably, the longitudinal axis A is oriented horizontally when the tank 1 is in the transport or use configuration.

The outer shell 3 comprises a plurality of reinforcing ribs 4 distributed in planes that are perpendicular to the longitudinal direction A. The ribs 4 are formed by deformations, for example by knurling, on one and the same wall of the outer shell 3 (central cylindrical portion).

As illustrated, these ribs 4 preferably protrude from the exterior surface of the outer shell 3. Preferably, the ribs 4 are formed over the entire circumference of the outer shell 3. For example, the ribs 4 are formed on the cylindrical wall so as to be spaced apart in the longitudinal direction A by a distance of between 50 and 200 mm, for example of around 100 mm.

Preferably, the ribs 4 are regularly distributed in the longitudinal direction A on the cylindrical portion (shell ring), for example according to the following formula: d=L/(n+2)

where: d=distance between two adjacent ribs, L=shell ring length, n=number of ribs. The distance d can vary depending on the other assembly elements (such as the position of feet on the tank, for example), but the distance d is preferably constant between each rib in order to distribute the stiffness of the shell ring.

The shell ring (cylindrical portion of a component) thus comprises a plurality of ribs 4 obtained by mechanical deformation.

Furthermore, at least one and preferably all of the ribs 4 comprise at least one reinforcing element 5. The reinforcing element 5 comprises a strip 5, which is made of metal or an alloy, for example, and is rigidly connected (fastened) to the two portions of the wall situated at the base and on either side of the rib 4.

The strip 5 is preferably welded to the outer shell 3 on either side of the rib 4.

The ribs 4 extend like the strips 5 in planes that are perpendicular to the longitudinal direction A over all or part of the circumference of the outer shell 3.

For example, one or a plurality or all of the ribs 4 are provided with a plurality of discrete strips 5 distributed over the circumference of the shell 3, for example, three strips 5. The strips are preferably uniformly distributed over the periphery of the tank 1.

For example, the strips 5 extend in a plane that is perpendicular to the longitudinal direction A over at least half of the circumference of the outer shell 3 (and are welded/fastened) therefore over at least half of the circumference of the shell 3.

Preferably, the one or more strips 5 have a width L5, measured in a direction that is parallel to the longitudinal direction A, of between one and three times the width L4 of the rib 4.

The proposed solution allows the axial stiffness of the tank 1 to be improved by limiting or preventing the accordion effect. These strips 5 may be fastened to the inner face of the outer shell 3.

These strips 5 increase the axial rigidity of the tank 1 and, furthermore, act as force-transmitting elements. The strips 5 are preferably made of the same material as the shell 3 to be stiffened. They allow the vacuum resistance of the tank 1 to be maintained. In the case of forces passing through the supporting structure, the strips are preferably positioned in line with the supports (tie rods/collars, etc.).

As described above, these strips 5 may be fastened only at certain locations on the shell 3 (in fact, it is not necessary to provide this reinforcement 5 over the entire periphery of each rib 4). This limits the impact on the total mass of the tank 1.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A cryogenic tank for transporting cryogenic fluid comprising an inner shell made of a metal material or alloy and configured to contain the cryogenic fluid, an outer shell made of a metal material or alloy, arranged around the inner shell and delimiting a space between the two shells, said space being under vacuum, the outer shell extending in a longitudinal direction and comprising a plurality of reinforcing ribs distributed in planes that are perpendicular to the longitudinal direction, the ribs being formed by deformations on one and the same wall of the outer shell, wherein the tank further comprises at least one reinforcing element for reinforcing at least part of at least one of the ribs, the reinforcing element comprising a plurality of strips, each strip rigidly connected to the two portions of the wall situated at the base and on either side of the rib,
    wherein the plurality of strips have a width, measured in a direction that is parallel to the longitudinal direction, of between one and three times the width of the rib.

2. The tank according to claim 1, wherein the plurality of strips are made of a metal material or alloy and is welded to the outer shell.

3. The tank according to claim 1, wherein the ribs extend over all or part of the circumference of the outer shell and in that at least part of the ribs is provided with at least one of the plurality of strips.

4. The tank according to claim 1, wherein the inner shell and the outer shell have a cylindrical general shape with a circular cross section and extending in the longitudinal direction, the longitudinal axis being oriented horizontally when the tank is in a transport or a use configuration.

5. The tank according to claim 1, wherein the ribs protrude from the exterior surface of the outer shell.

* * * * *